United States Patent [19]
Johnson et al.

[11] Patent Number: 4,567,960
[45] Date of Patent: Feb. 4, 1986

[54] FIXED GEOMETRY CONTROLLED ENTRAINMENT VENTILATED CONVERGENT NOZZLE AND METHOD

[75] Inventors: Joseph M. Johnson, Bothell; Russell L. Thornock, Seattle, both of Wash.

[73] Assignee: The Boeing Company, Seattle, Wash.

[21] Appl. No.: 410,525

[22] Filed: Aug. 23, 1982

[51] Int. Cl.$^4$ ............................................. F01N 1/14
[52] U.S. Cl. .................... 181/220; 181/296; 239/265.17; 60/262
[58] Field of Search ............... 181/213, 216, 220, 259, 181/262, 263, 296; 239/127.3, 265.11, 265.17, 265.19, 265.25, 265.27; 60/224, 226.1, 226.2, 262, 264

[56] References Cited

U.S. PATENT DOCUMENTS

| | | | |
|---|---|---|---|
| 3,002,341 | 10/1961 | Muzzy et al. | 239/265.17 |
| 3,039,560 | 6/1962 | Duthion et al. | 181/220 |
| 3,305,177 | 2/1967 | Fage | 239/127.3 |
| 3,358,453 | 12/1967 | Swet | 60/225 |
| 3,368,352 | 2/1968 | Hewson | 60/224 |
| 3,402,894 | 9/1968 | Wynosky et al. | 239/265.17 |
| 3,455,413 | 7/1969 | Henley | 181/213 |
| 3,527,407 | 9/1970 | Mueller et al. | 239/265.19 |
| 3,579,993 | 5/1971 | Tanner et al. | 60/262 |
| 3,613,826 | 10/1971 | Cabassut | 181/220 |
| 3,655,009 | 4/1972 | Hilbig | 181/220 |
| 3,693,880 | 9/1972 | Versaw et al. | 239/127.3 |
| 3,820,630 | 6/1974 | Huff | 181/220 |
| 3,861,140 | 1/1975 | Krabacher | 60/262 |
| 3,881,315 | 5/1975 | Hess et al. | 60/226 |
| 3,886,737 | 6/1975 | Grieb | 60/226 |
| 3,896,615 | 7/1975 | Slatkin et al. | 60/204 |
| 3,910,375 | 10/1975 | Hache | 181/220 |
| 4,044,555 | 8/1977 | McLoughlin et al. | 60/264 |
| 4,135,363 | 1/1979 | Packman | 60/262 |
| 4,214,441 | 7/1980 | Mouritsen et al. | 60/262 |

Primary Examiner—Benjamin R. Fuller
Attorney, Agent, or Firm—Eugene O. Heberer

[57] ABSTRACT

A combination convergent jet engine aircraft nozzle (86, 142, 146) and a ventilation tube (88, 136, 144) are fixed in place and have no moving parts. Ambient air is entrained through duct inlets (96, 140, 154, 160), through the nozzle walls, through hollow struts (90, 138), the struts supporting and being connected to a hollow central tube (102, 144) or a plurality of tubes (136), to adjacent the downstream end of the nozzle to mix at takeoff with the jet forming gas exhaust. The ducts (102, 136, 144) are positioned with respect to the nozzle exhaust so that entrained ambient air flows into the gas exhaust during takeoff and so that the ambient air flow is substantially restricted or shut off during cruise flight. Ambient air inlet openings (160) are formed as a porous surface, the holes through the surface being generally in the shape of louvers (166) of which downstream end portions (174) are depressed inwardly of the outer wall surface of the nozzle to provide a minimum drag along the outer nozzle periphery during cruise flight and at takeoff.

A method of positioning and fixing the outlet end of a noise suppressor within a convergent nozzle so that entrained ambient air flows into the gas exhaust during takeoff to substantially reduce the engine noise and so that ambient air is substantially restricted or is shut off entirely during cruise flight.

The method in which ambient air is entrained in a noise suppressor within a convergent nozzle and is exited downstream adjacent the nozzle downstream end to mix with the gas exhaust during takeoff to suppress the engine noise, and at cruise flight substantially restricting or shutting off the ambient air through the noise suppressor by turning engine exhaust gas toward the noise suppressor axis downstream of the ambient air exit.

23 Claims, 14 Drawing Figures

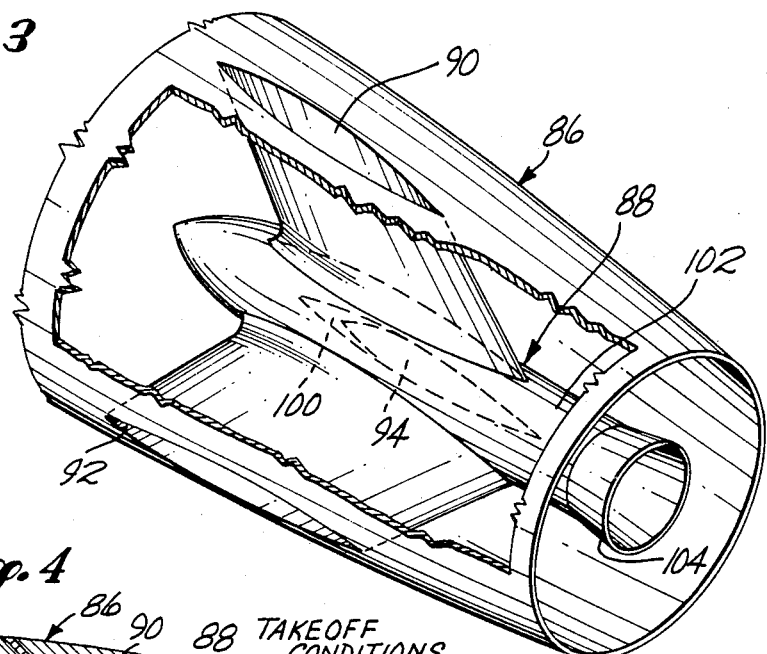
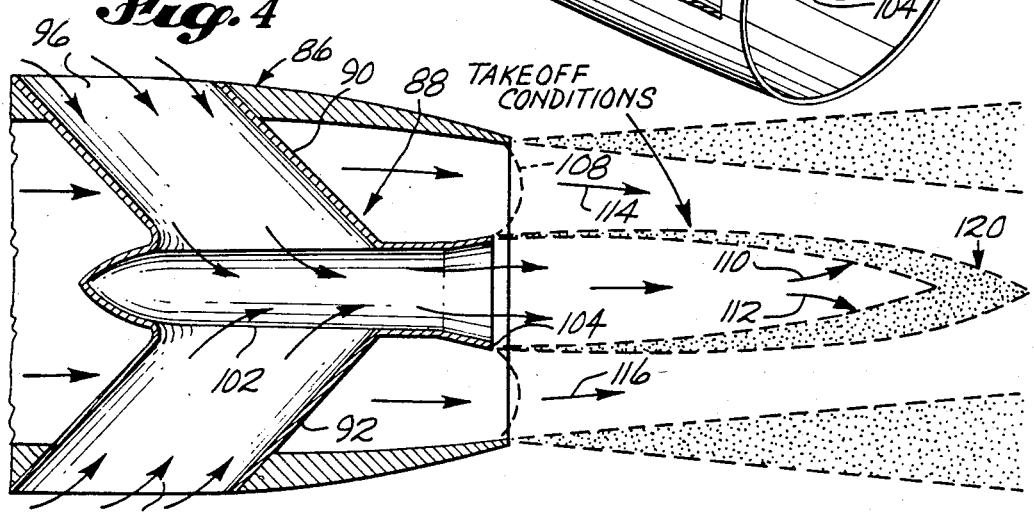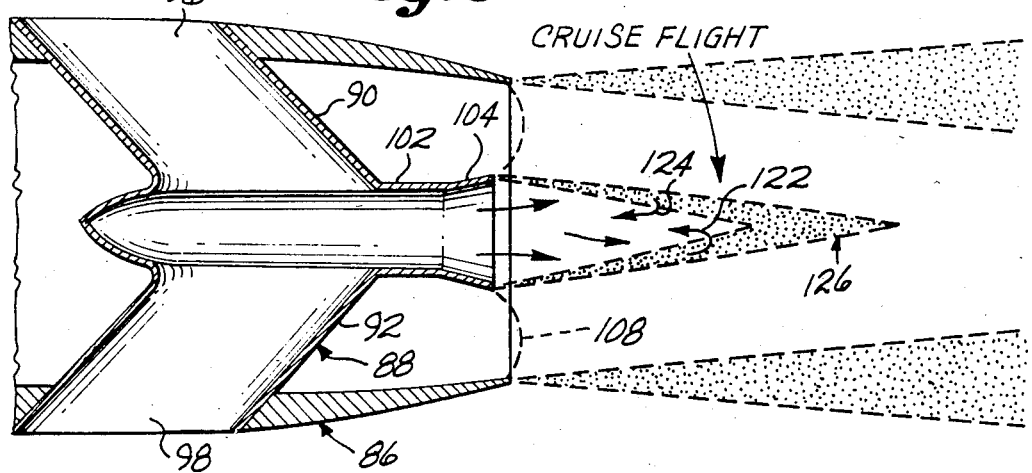

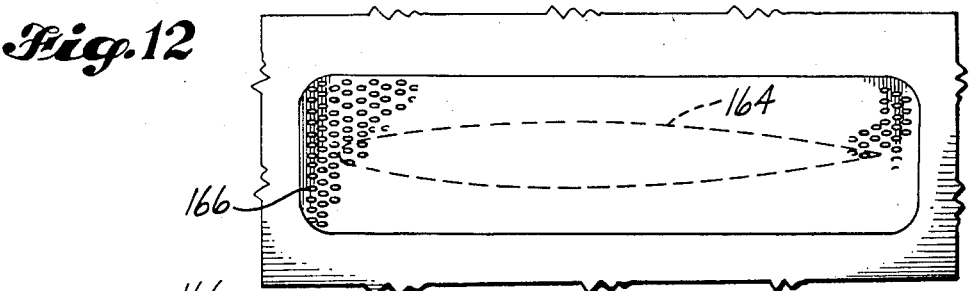
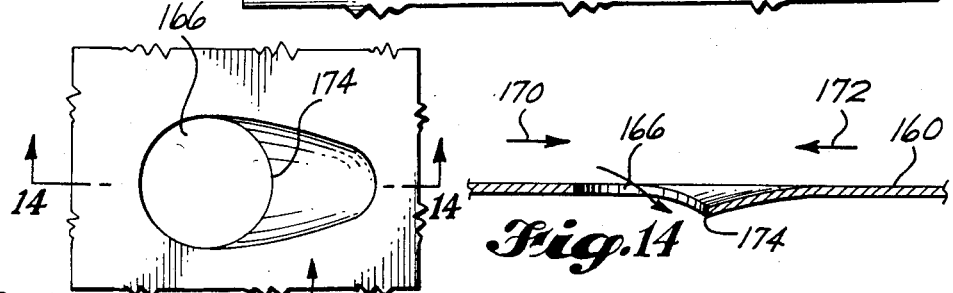
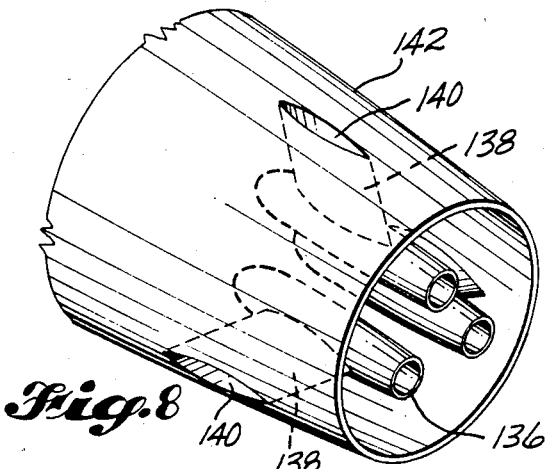
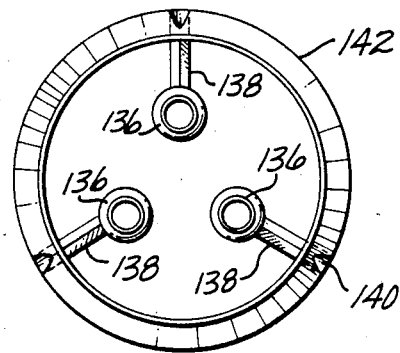
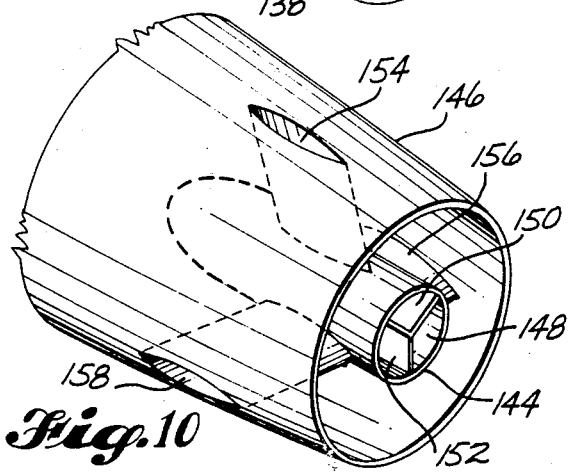
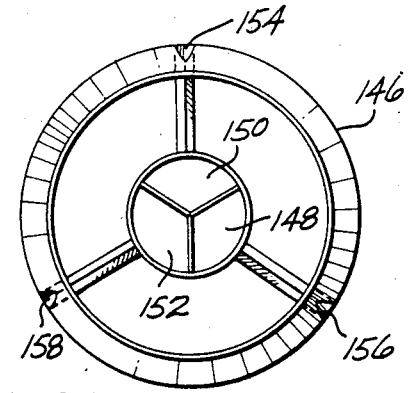

FIXED GEOMETRY CONTROLLED ENTRAINMENT VENTILATED CONVERGENT NOZZLE AND METHOD

DESCRIPTION

1. Technical Field

This invention relates to jet noise suppressors in convergent jet engine nozzles and particularly, for jet noise suppression structure and method in which there are no moving parts.

2. Background Art

Noise suppression for jet engines in aircraft is required during a very small period of the flight, namely, at takeoff. Jet noise suppression devices, however, have to be carried with their thrust and drag penalties throughout the entire flight, whereby sometimes severe economic costs are imposed for the noise benefit provided only at takeoff.

A viable noise suppressor, therefore, will have low thrust and drag penalties as well as a reliable design. In the prior art, some jet noise suppressors have been comprised of tubular means for internally ventilating the exhaust flow. These suppressors entrain ambient air that is mixed with the gas exhaust from the engine near the downstream end of the nozzle. Generally such noise suppressors produce both the desired takeoff noise suppression and undesirable drag penalties during cruise flight. In these suppressors, the entrained air flow is drawn through external inlets into vent tube struts or ducts within the nozzle.

Internal ventilation is an entraining process by which the lower velocity ventilating airflow is drawn into and mixes with the high velocity engine exhaust which surrounds it near or at the downstream end of the nozzle. The amount of flow which is entrained is dependent, all other conditions being held constant, on the length of the mixing or entrainment region downstream of the vent tube-the longer the length of the region the more flow being entrained.

For example, for the maximum entrainment at takeoff a divergent tube end is the most desirable configuration. When the most desirable configuration for takeoff has been determined, the problem arises of reconciling it with the need for low drag characteristics in cruise flight. The general rule is that the more flow entrained during cruise flight, the more drag penalty exists. It is consequently desirable to eliminate or at least minimize the amount of flow entrained in cruise flight.

Configurations have been examined which have moving parts to permit a flow of entrained air at takeoff and to shut it off in cruise flight. However, any moving parts in an engine exhaust system represent a large decrease in reliability relative to a system with no moving parts. This translates directly to an economic penalty, that is, added maintenance costs.

A search of the patent literature illustrates a number of systems in which ambient air has been introduced into a jet engine nozzle for the purpose of noise suppression. U.S. Pat. No. 3,910,375 illustrates a jet engine silencer in which ambient air is permitted to flow from the exterior of the nozzle into a central body. The air is caused to mix with the exhaust gases and this arrangement provides a relatively small internal ventilation area. A complicated actuation system is required to convert the nozzle from an internally ventilated noise suppressor to a simple plug nozzle. That is, a number of mechanically actuated parts are required to operate flaps in a central plug, the flaps being opened during takeoff and closed during cruise flight.

U.S. Pat. No. 3,030,560 discloses a silencer in which inlets of air ducts are spaced around the periphery of the nozzle. Air ducts extend radially inwardly so that the gas flows therearound and out of the nozzle. Outlets of the air ducts are arbitrarily in the same plane as the outlet of the nozzle from which the exhaust gases flow. The invention relates primarily to the shape of the exit cross section and no mention is made of controlling the entrainment rate. The structure is of fixed geometry and the internally ventilating tubes are of pie-shape cross section.

U.S. Pat. No. 3,613,826 illustrates a jet engine silencer having ambient air intake vents spaced around the nozzle periphery. Orientatable tubular elements extend from the vents into the nozzle and are terminated somewhat upstream of the nozzle discharge end. The tubular elements are mechanically actuated and have two positions, one being as an internally ventilating nozzle for noise suppression and the other being a simple convergent nozzle in which the vent tubes have become an integral part of the nozzle contour. The mechanical complexity of the system has been introduced in order to get rid of the penalties of the internally ventilated nozzle for cruise flight. That the vent tubes are somewhat upstream of the nozzle exit is more a matter of mechanical design than any intention to control the entrainment characteristics.

U.S. Pat. No. 3,820,630 does not provide means for internal ventilation. Structure is provided to breakup an initially circular exhaust jet by the addition of various downstream surfaces. In addition, an ejector shroud is proposed to surround the nozzle system.

The following additional patents, found in the search, disclose noise suppressors and various types of jet engine nozzles:

U.S. Pat. No. 3,002,341
U.S. Pat. No. 3,305,177
U.S. Pat. No. 3,358,453
U.S. Pat. No. 3,368,352
U.S. Pat. No. 3,402,894
U.S. Pat. No. 3,455,413
U.S. Pat. No. 3,527,407
U.S. Pat. No. 3,579,993
U.S. Pat. No. 3,655,009
U.S. Pat. No. 3,693,880
U.S. Pat. No. 3,861,140
U.S. Pat. No. 3,881,315
U.S. Pat. No. 3,886,737
U.S. Pat. No. 3,896,615
U.S. Pat. No. 4,044,555
U.S. Pat. No. 4,135,363
U.S. Pat. No. 4,214,441

DISCLOSURE OF THE INVENTION

The invention includes a convergent nozzle and internal ventilation tube, the combination being of fixed geometry, permitting a flow of ventilation air at takeoff conditions and restricting or shutting off the airflow at cruise flight without the need for any moving parts in the system. The central portion of the nozzle is generally open, and the structure within the nozzle being such as to provide a minimum of drag for the gas exhaust, as well as the venitlation air.

A unique feature of the invention is the location of the downstream end or exit of the internally ventilating tube or tubes of the noise suppressor, with respect to the nozzle exit, to produce the desired results. Previous internally ventilated nozzles had vent exits arbitrarily placed at the nozzle exit plane, or when efforts had been made to maximize the amount of entrained mass flow at take-off, the ventilating tube exits were downstream of the nozzle and mechanical means had to be employed to shut off the entrained flow at cruise.

Between takeoff and cruise flight, the nozzle pressure ratio of a typical engine for which jet noise suppression is desirable changes from approximately 2.0 to about 3.0. Nozzle pressure ratio is the total pressure of the flow in the nozzle divided by the static pressure in the environment to which the nozzle exhausts.

For example, considering engines for which jet noise suppression is desirable, for a takeoff at sea level the static pressure in the environment, or the atmospheric pressure is about 14.7 psi. and the total pressure of the flow in the nozzle is about 29 psi.; thus, according to the definition of the "nozzle pressure ratio" above, by dividing approximately 29 psi. by about 14.7 psi., the nozzle pressure ratio equals about 2. Similarly, at cruise flight altitudes of about 35,000 feet, the environmental static pressure is about 3.46 psi. and the total pressure of the flow in the nozzle is about 10 psi. so that by dividing approximately 10 psi. by 3.46 psi., the nozzle pressure ratio equals about 3. Considering a takeoff at the airport at La Paz, Bolivia, where the altitude for a commercial airport is probably the highest, namely, 13,354 feet, the atmospheric static pressure is about 8.86 psi. and the total pressure of the flow in the nozzle for takeoff is about 18 psi. so that the nozzle pressure ratio equals about 2. From the foregoing, it is clear that the nozzle pressure ratio has no unit value but is obtained from dividing two numbers having unit values of pounds per square inch. It should be noted that for nozzle pressure ratios greater than 1.89 the Mach numbers within the nozzle are constant and specifically, the Mach number at the nozzle exit is 1.0 and remains so for all pressure ratios greater than 1.89. Outside of the nozzle, the flow speeds up and the Mach numbers increase with increasing nozzle pressure ratios.

Considering the gas exhaust flow at the internally ventilating tube exits, for exit edge Mach numbers less than 1.0, there is no turning of the flow as it moves past the edge. However, if the edge Mach number is 1.0 and the nozzle pressure ratio is about 3.0, the exhaust flow turns by 7.7 degrees toward the vent tube center line. Thus, the turning of the gas exhaust at the vent tube exit toward the axis of the airflow therefrom greatly reduces the length of the entrainment region and therefore the amount of entrained air, compared with the amount of entrainment at the expected nozzle pressure ratio of 2.0 for takeoff, where the amount of flow turning would be much less.

It has been found, according to the invention, in an internally ventilated convergent nozzle that the vent tube exit or exits should be located at the nozzle sonic surface. The nozzle sonic surface is the locus of all points in the nozzle flow at which the nozzle flow equals the velocity of sound.

Then, within a certain range of placements, at nozzle pressure ratios near 2.0 for takeoff, there is airflow entrained through the vent to produce significant noise suppression, and near 3.0 for cruise flight, the airflow through the internally ventilating noise suppressor is greatly reduced or shut off. It has been further found, according to the invention, that the mechanism for shutting off this airflow is the sudden expansion of the nozzle gas exhaust flow at the vent exit to produce the turning of this flow toward the vent center line and a resulting closing off of the entrained air in the vent.

It should be noted that the nozzle sonic surface will remain attached to the vent exit for a range of locations adjacent the nozzle exit, both upstream and downstream thereof. Thus, the invention includes the ventilating tube exit (or exits) being effective at takeoff and at cruise flight in a range of locations adjacent the exhaust nozzle end where the nozzle sonic surface intersects all or part of the periphery of the vent exit. Because differently shaped convergent nozzles have differently shaped sonic surfaces, it should be recognized that there is no specific geometric definition that can be given without first specifying the nozzle shape. It is not the intent of this invention to specify the convergent nozzle shape.

It is not intended to limit the shape of the vent tube or tubes to a cylindrical one. Variations from cylindrical will result in variations of entrained mass air flow for given exit sizes and locations. A divergent exit shape will result in more entrained flow than a cylindrical one and, accordingly, a convergent exit will result in less flow. Both the vent exit location and shape are chosen to produce the desired overall entrainment characteristics in the design process. The tube exit location is first chosen in order to approximately obtain the desired entrainment curve for nozzle pressure ratios between about 1.0 and 3.0; and then the vent exit shape is chosen to closely determine the desired entrainment rate.

Because the nozzle and noise suppressor are designed to produce or entirely eliminate entrained air flow at cruise flight and because low drag at cruise flight is highly desirable, special attention is given to the ambient air inlet. An aerodynamically ideal solution would be an inlet, open at takeoff but closed at cruise flight; but, this would involve moving parts, the feature that the present invention specifically avoids. Thus, according to the invention, a fixed geometry inlet having low drag at the low cruise air mass flow rates is desired. Such an inlet, according to the invention, is comprised of a porous surface made up of circular-shaped louvers, having their downstream edges depressed below the upstream so as to provide a minimum drag for the inlet at cruise flight. Such an inlet produces comparatively little drag at takeoff conditions because of the low speed involved.

Further advantages of the invention will be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 3 is a pictorial view of an internally ventilated convergent nozzle having a vent tube with a divergent exit;

FIG. 4 is a cross-sectional view of the nozzle and vent tube shown in FIG. 3, operating at takeoff for noise suppression;

FIG. 5 is a cross-sectional view of the nozzle in FIG. 4, illustrating the shut off of the ambient air entrainment during cruise flight;

FIG. 8 is a pictorial view of a convergent nozzle having a three tube noise suppressor with convergent exits;

FIG. 9 is an end view of the nozzle and noise suppressor shown in FIG. 8;

FIG. 10 is a pictorial view of a convergent jet engine nozzle having a noise suppressor divided in three parts;

FIG. 11 is an end view of the nozzle shown in FIG. 10;

FIG. 12 is a plan view of a porous noise suppressor inlet extending along an outer wall of a nozzle;

FIG. 13 is a plan view of one of the small openings of the inlet in FIG. 12; and FIG. 14 is a cross-sectional view along the line 14—14 in FIG. 13.

BEST MODE FOR CARRYING OUT THE INVENTION

Figure 1:
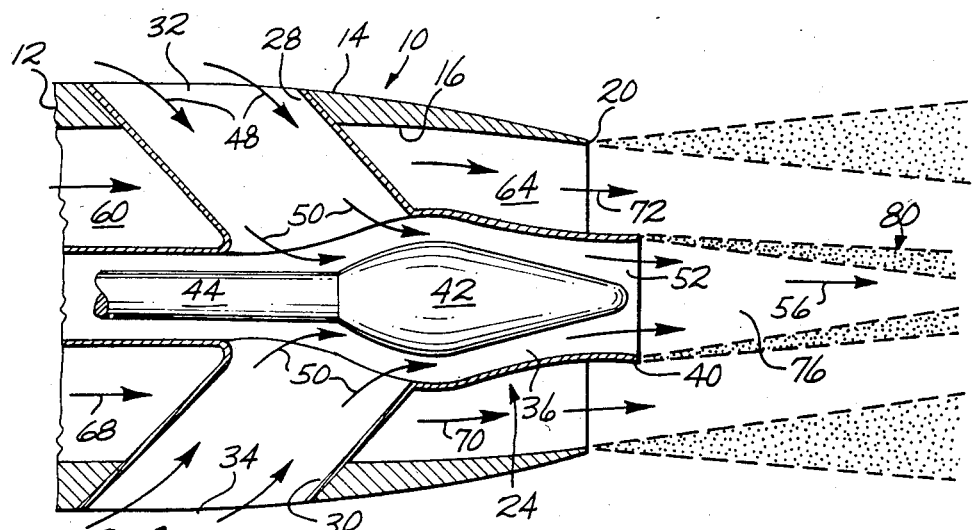
FIG. 1 is a cross-sectional view of a prior art internally ventilated jet engine nozzle, having a centrally positioned mechanically actuated plug open in the takeoff position.
Figure 2:
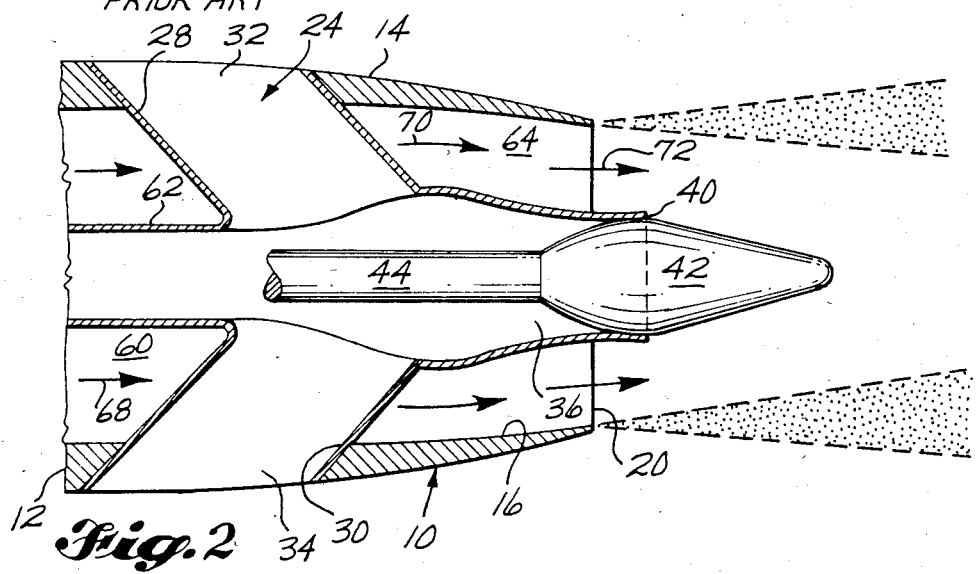
FIG. 2 is a cross-sectional view of the prior art internally ventilated nozzle shown in FIG. 1 with the plug in the closed position for cruise flight.

Referring again to the drawings, there is shown in FIGS. 1 and 2 a convergent nozzle 10 for a jet aircraft engine, not shown, adapted to have its upstream end 12 secured to the jet engine. The nozzle has outer converging wall 14 and inner converging wall 16, terminating in a downstream exhaust end 20 from which a propulsive gas jet issues.

Within the nozzle there is a plenum chamber and vent tube, generally designated as 24. The plenum and vent is supported by a plurality of hollow struts 28 and 30. Typically, there are three. Each of the struts extends through the nozzle wall structure and has an ambient air inlet, as 32 and 34. The inlets are connected through the hollow struts to a internal vent or duct means 36. The duct 36 is of slightly irregular but generally cylindrical configuration, having a cylindrical downstream end 40. The configuration of the duct 36 upstream of the end 40 is designed to accommodate a central plug 42, supported on a shaft 44 which is actuated by means not shown to move the plug 42 from its open position, shown in FIG. 1, to a closed position in FIG. 2, where the large diameter surface of the plug seats on the internal surface of the end 40 to seal off the vent tube 24.

The vent tube 24 is designed to entrain ambient air during takeoff, the air flowing in the directions of the arrows 48, 50, 52 and 56. Because of the plug 42, the nozzle has a somewhat closed central portion, particularly as shown in FIG. 2, and an annulus 60 is formed around tubular member 62 which encloses the rod. A smaller annulus 64 surrounds the duct 36. The gas exhaust from an engine flows through the annulus 60, as indicated by the arrows 68, around the hollow struts and as further indicated, by the arrows 70 into the annulus 64, the arrows 72 indicating the formation of the exhaust jet externally of the downstream end of the nozzle.

The vent tube 24 causes a substantial amount of air to be entrained through the inlets and into the area 76 surrounded by the exhaust jet. The air from the area 76 mixes with the exhaust jet in a mixing region indicated at 80 which reduces the jet noise produced at takeoff. If this same flow were allowed to continue during cruise flight, it would produce a large amount of drag to reduce the effectiveness of the jet, and thus, become an economic problem because of excessive demands of fuel. This was recognized in the prior art and resulted in the use of a central plug such as 42 to stop the flow of entrained air during cruise flight when there is no demand for noise reduction. However, movable parts such as the actuating means of the rod 44 and the plug 42 within the hot high speed nozzle exhaust greatly reduce the durability of the exhaust system and thus increase the maintenance cost associated with its use.

In FIGS. 3–5, there is shown a jet aircraft convergent nozzle 86 having a fixed vent tube, generally designated as 88, the nozzle and tube form a noise suppressor characterized as being of low-drag structure and having no moving parts. This type of noise suppressor permits a low-drag, continuously open hollow nozzle by the elimination of the movable plug shown in FIGS. 1 and 2. The vent tube system or duct means is formed in part of low-drag hollow struts 90, 92, and 94.

Here the hollow struts extend through and are connected to the walls of the nozzle at the ambient air inlets 96, 98, and 100 to form a part of the vent or duct means along with the struts and the centrally positioned tube 102. The tube 102 is supported in position by the struts and has a generally cylindrical configuration except at the downstream end 104 where it is divergent to provide a greater entrained air flow than if the end were cylindrical or convergent. The end is positioned upstream of the nozzle exit. That location is selected with respect to obtaining the desired entrainment characteristics, and then the exit shape is selected to obtain the desired flow rate as closely as possible. To achieve the desired results for takeoff and cruise flight the vent or duct means exit 104 must be located at the nozzle sonic surface 108 where the exhaust gas exit Mach number is 1.0.

During takeoff where the nozzle pressure ratio is about 2.0, and, for example, the atmospheric or environmental static pressure at sea level is about 14.7 psi., and the nozzle total pressure is about 29 psi., there is substantial air entrainment through the inlets 96, 98 and 100 into the central tube 102, and discharged at the end 104, FIG. 4, where the arrows 110 and 112 indicate that the entrained flow continues to move in a downstream direction as it merges with the propulsive jet from the engine indicated by the arrows 114 and 116. The long length of the entrainment region 120 provides for a substantial amount of entrained air to mix with the exhaust jet in order to produce a significant noise reduction at takeoff.

During cruise flight, FIG. 5, where noise suppression is not important and the nozzle pressure ratio is raised to about 3.0, and, for example, the environmental static pressure is about 3.46 psi. at 35,000 feet, and the nozzle total pressure is about 10 psi., the air flow through the noise suppressor is substantially reduced or shut off. This is indicated by the shorter mixing region 126 and the reverse flow arrows 122 and 124. The mechanism for shutting off the air flow is the sudden expansion of the nozzle flow at the vent exit, resulting from the increased nozzle pressure ratio, which produces a turning of the exhaust gas toward the vent center line or axis with a resulting shortening of the entrainment region. Besides this a reverse flow shown by arrows 122 and 124 may occur, reducing the net amount of flow entrained. This reduces or eliminates the drag resulting from the entrained flow as it is eliminated by the plug in FIG. 2.

Figure 7:
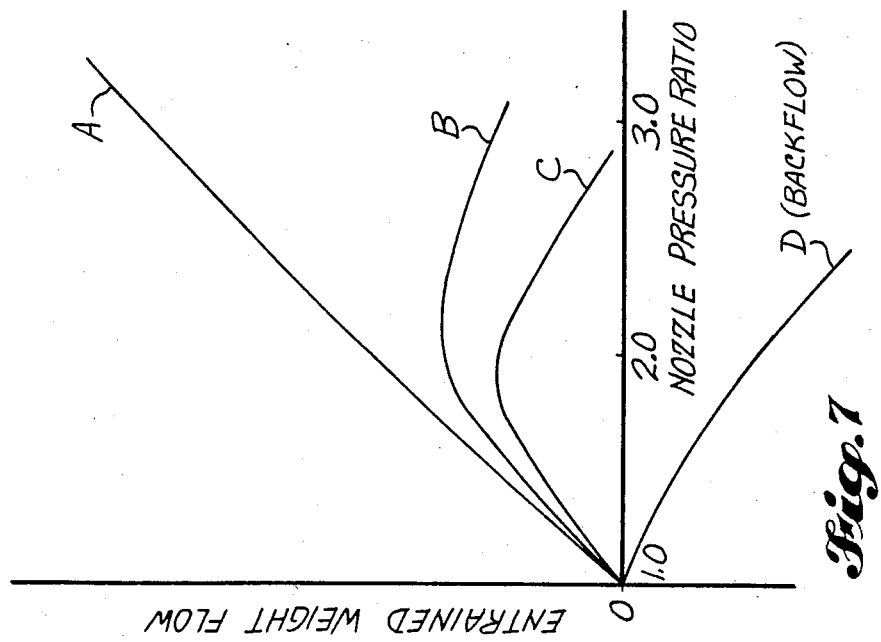
FIG. 7 is a graph of entrained weight flow vs. nozzle pressure ratios, between pressure ratios of 1.0 and 3.0 for the four ventilating tube positions shown in FIG. 6.
Figure 6:
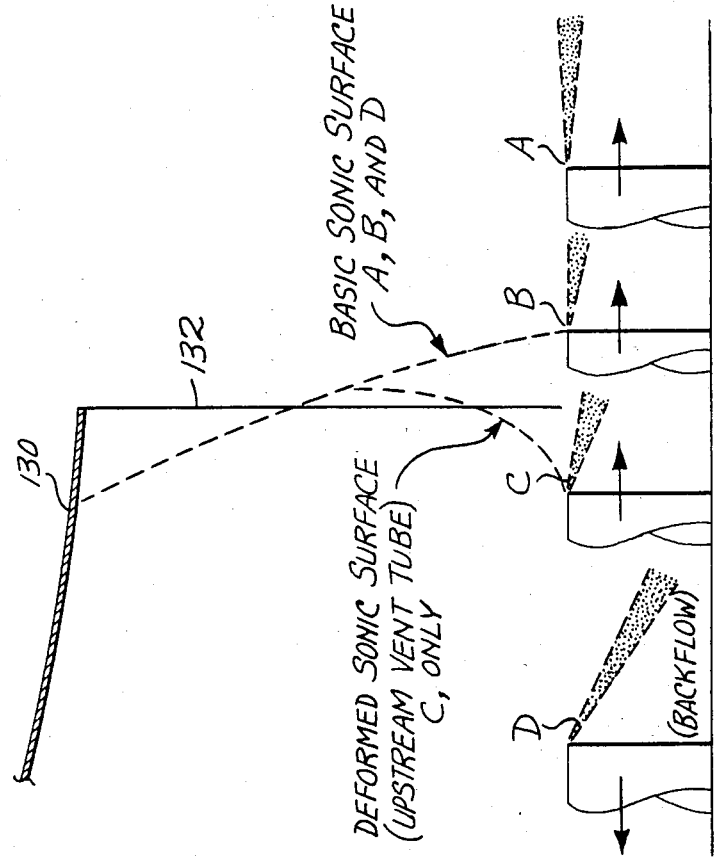
FIG. 6 is a schematic view illustrating four positions of an exit tube of a noise suppressor adjacent the downstream end of a nozzle and showing the position of nozzle sonic surface relating to the tube positions.

In FIG. 6, an internally ventilated nozzle 130 having a downstream end 132 is shown fragmentarily to illustrate the effect of axial locations of the exit of the internal vent duct. The relationship between the entrained weight flow and the nozzle pressure ratios for each of the four locations in FIG. 6 is diagrammed in FIG. 7.

The basic nozzle sonic surface for vent positions A, B and D for the nozzle and for the locations of the exit are shown, vent B being located at the nozzle sonic surface. That is, the vent exit at B is in a proper position to function to entrain an adequate amount of air for noise suppression and also to shut off air flow during cruise flight.

The position for the vent at C is upstream of the basic nozzle sonic surface and of the nozzle exhaust but the sonic surface remains attached to the vent, although it is deformed. The position at C is effective to function within the requirements of the invention.

The locations of the exits at A and D are out of the range of placement where they would be satisfactory for both adequate air entrainment for noise suppression and suitable to greatly reduce or shut off the flow during cruise flight. That is, the downstream location of the vent exit A could be chosen if the only consideration were maximizing the entrained flow for noise suppression. With the vent exit at this location, the entrainment constantly increases with the increasing nozzle pressure ratio in the region of interest between 1.0 and 3.0, FIG. 7. Curve A in FIG. 7 would peak at some pressure ratio greater than 3 and then fall off at still higher values and thus, would not be suitable for shutoff of the entrained air at cruise flight.

Generally, the entrainment-nozzle pressure ratio relationship will occur as a peaked curve with the peak being at lower pressure ratios for increasingly upstream locations of the vent tube exit. For the peak to occur near takeoff conditions, 2.0, the vent exit must be located at the sonic surface of the nozzle, this surface being the locus of all points in the nozzle flow at which the nozzle flow equals the velocity of sound.

In the position at D, the sonic surface is no longer attached to the vent exit and has nearly resumed its original shape. The result is a back flow of the exhaust gas into the vent exit and out of the inlet. This is a situation not within the scope of the invention.

To be within the scope of the invention the ventilated nozzle must have its vent exit or exits adjacent the nozzle exhaust such that the nozzle sonic surface intersects all or part of the periphery of the vent exit. Because differently shaped convergent nozzles have differently shaped sonic surfaces, there is no specific geometric definition that can be given for the vent, the vent exit location, and the sonic surface without first specifying the nozzle shape.

The exit ends of the internally ventilating tubes or duct means are not limited to cylindrical shapes, shown in FIG. 6 or the divergent exit in FIGS. 3-5. They may also be of low-drag configuration and convergent as shown in FIGS. 8 and 9. Here each of the convergent ventilating tubes 136 have one supporting hollow low-drag strut 138 with an inlet 140 extending through nozzle wall 142. In this embodiment the nozzle sonic surface intersects all or part of the periphery of each of the vent exits 136.

In FIGS. 10 and 11 there is another embodiment having a single cylindrical ventilating tube 144 within a convergent nozzle 146. Within the tube 144 there are three separate ventilating ducts 148, 150 and 152. Each separate duct has its own inlet and supporting hollow strut 154, 156 and 158.

A divergent exit shape results in more entrained air than a cylindrical one and a convergent exit results in less entrained air. Both the exit location and shape are chosen to produce the desired overall entrainment characteristics. In the design process the tube exit location is first chosen in order to obtain approximately the desired entrainment curve, as B and C in FIG. 7, and then the vent exit shape is chosen to more closely determine the desired entrainment rate.

Because the nozzle and noise suppressor combination is designed to reduce or entirely eliminate entrained flow at cruise flight, and because low drag on the nozzle wall is highly desirable, the ambient air inlets have been conceived with the foregoing under consideration. The aerodynamically ideal solution would be an inlet, open at takeoff but closed at cruise, but this would involve moving parts which the invention specifically avoids.

An ambient air inlet 160, extending along an outer nozzle wall 162, FIGS. 12-14, is proposed according to the invention. The inlet externally of a hollow strut 164 is comprised of a multiplicity of holes to form a porous surface. Each hole 166 is shaped generally in the form of a circular louver. As shown in FIG. 14, the arrow 170 indicates the direction of the air flow and the arrow 172 is the direction of the aircraft. The upstream end of the louver is at the level of the plate 160 and a portion of the downstream edge 174 is depressed below the external surface of the plate 160. This results in a minimum drag for the louver at cruise flight. At takeoff, the inlet will produce comparatively little drag because of the lower speed involved.

The invention and its attendant advantages will be understood from the foregoing description and it will be apparent that various changes may be made in the form, construction, and the arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

We claim:

1. In a convergent jet engine aircraft nozzle adapted to exhaust a propulsive gas jet, said nozzle having wall means longitudinally bounding a substantially open portion, said wall means bounding said portion converging toward a downstream exhaust end, jet engine noise suppressor means for supplying ambient air through the inside of said nozzle so as to reduce the noise produced by said gas jet during takeoff, said suppressor means including duct means for entraining said air through said wall means, into said nozzle, and to a position associated with the nozzle downstream end to mix with the gas exhaust at takeoff, said duct means having upstream inlet and downstream outlet ends, the improvement comprising:

said duct means being open upstream to entrain the ambient air during takeoff and being connected into said wall means for entraining said air during takeoff downstream out of said duct means to mix with the jet forming gas exhaust;

said duct means being of substantially minimum low-drag configuration, relative to air flow therethrough and gas flow therearound, said duct means being continuously open between and at upstream and downstream ends and being fixed in shape and position, and being positioned downstream in association with the nozzle exhaust so that the entrained ambient air flows into the gas exhaust during takeoff and so that ambient air flow is substantially restricted or is shut off entirely during cruise flight.

2. The invention according to claim 1 in which:
said duct means terminate downstream so as to have the outlet end at a locus of all points in the nozzle flow at which the nozzle flow equals the velocity of sound, said locus being the nozzle sonic surface or at a deformed version thereof.

3. The invention according to claim 1 in which:
said duct means terminate downstream in a position in said association, where at a nozzle pressure ratio of about 2.0, there is sufficient ambient air flow out of the duct means downstream so as to produce significant jet engine noise suppression; and at a nozzle pressure ratio of about 3.0, the ambient air flow into the duct means is greatly reduced or shut off.

4. The invention according to claim 1 in which:
said duct means terminate in said association with the nozzle downstream end, whereby at cruise flight a sudden expansion of nozzle gas produces a turning of the gas flow toward the axis of the duct means to close off the flow of air through the duct means.

5. The invention according to claim 1 in which:
said duct means terminate downstream so as to have the outlet end with respect to the nozzle at a locus of all points in the nozzle flow at which the nozzle flow equals the velocity of sound, said locus being the nozzle sonic surface and intersecting all or part of the periphery of the ambient air exit of the duct means.

6. The invention according to claim 5 in which:
the periphery of the end of the duct means at which the ambient air is exited is of a shape selected from one of the group consisting of cylindrical, divergent, and convergent.

7. The invention according to claim 6 in which:
the location of the exit end of the duct means is first selected to obtain the desired air entrainment curve for the nozzle pressure ratios of between about 1.0 and 3.0, and the exit end shape is then selected to more closely determine the desired entrainment rate.

8. The invention according to claim 1 in which:
the upstream open ends of the duct means are formed of a porous surface having multiple small openings, said porous surface extending along the periphery of the outer wall surface of the nozzle.

9. The invention according to claim 8 in which:
the openings are louvers of which downstream end portions are depressed inwardly of the outer wall surface to provide minimum drag at the openings during cruise flight.

10. The invention according to claim 5 in which:
the upstream open ends of the duct means are formed of a porous surface having multiple small openings, said porous surface extending along the periphery of an outer wall surface adjacent the nozzle.

11. The invention according to claim 10 in which:
the openings are louvers of which downstream end portions are depressed inwardly of the outer wall surface to provide a minimum drag along the outer wall surface during cruise flight.

12. The invention according to claim 6 in which:
said duct means in the nozzle are a plurality of tubes, each having the location of its exit end first selected to obtain the desired air entrainment curve for the nozzle pressure rations of between about 1.0 and 3.0, and the exit end shape then selected to more closely determine the desired entrainment rate.

13. The invention according to claim 5 in which:
said duct means in the nozzle are a plurality of tubes, said tubes being selected from one of the group consisting of a plurality of spaced tubes and joined tubes.

14. The method of suppressing jet engine noise in an aircraft by internally ventilating, with ambient air through a noise suppressor in a convergent nozzle, and substantially reducing the drag of the noise suppressor during cruise flight; said nozzle having wall means longitudinally bounding a substantially open portion, said wall means converging toward a downstream exhaust end; said noise suppressor including duct means for carrying said air through said wall means, into said nozzle, and to a position associated with the nozzle downstream end to mix with the gas exhaust at takeoff; said duct means having upstream inlet and downstream outlet ends; said method comprising:

entraining ambient air into the duct means and exiting the air downstream adjacent the nozzle downstream end to mix with the gas exhaust during takeoff; and turning the engine exhaust gas toward the duct means axis downstream of the ambient air exit during cruise flight, and substantially restricting or shutting off the ambient air flow through the duct means.

15. The method according to claim 14 including:
locating the periphery of the duct means at which the ambient air is exited at a locus of all points in the nozzle flow at which the nozzle flow equals the velocity of sound, said locus being the nozzle sonic surface or a deformed version thereof.

16. The method according to claim 14 including:
entraining sufficient ambient air into the duct means at a nozzle pressure ratio of about 2.0 so as to produce significant jet engine noise suppression at takeoff; and
at a nozzle pressure ratio of about 3.0, substantially reducing or shutting off entrainment of ambient air during cruise flight.

17. The method according to claim 14 in which:
at cruise flight said turning of exhaust gas toward the duct axis occurs with a sudden expansion of the gas adjacent the downstream exit of the duct means.

18. The method according to claim 14 including:
intersecting all or part of the periphery of the ambient air of the duct means at a locus of all points in the nozzle flow at which the nozzle flow equals the velocity of sound, said locus being the nozzle sonic surface or a deformed version thereof.

19. The method according to claim 18 in which:

the periphery of the duct means at which the ambient air is exited is of a shape selected from one of the group consisting of cylindrical, divergent, and convergent.

20. The method according to claim 19 including:

first selecting the location of the exit end of the duct means relative to nozzle exit to obtain the desired entrainment curve for the nozzle pressure ratios of between 1.0 and 3.0, and then selecting the exit end shape of the duct means to more closely determine the desired entrainment rate of ambient air.

21. The method according to claim 14 including:

flowing the ambient air at the upstream end of and into the duct means through a porous surface having multiple small openings along the periphery of an outer wall surface of the nozzle.

22. The method according to claim 21 in which:

the openings are generally in the shape of louvers of which downstream end portions are depressed inwardly of the outer wall surface to provide a minimum drag along the outer nozzle periphery at the openings during cruise flight, and to provide minimum drag at takeoff.

23. The method according to claim 18 in which:

all of the parts of the noise suppressor, the duct means, and the nozzle are fixed together in place.

* * * * *